US007004862B2

(12) United States Patent
Fukuda

(10) Patent No.: US 7,004,862 B2
(45) Date of Patent: Feb. 28, 2006

(54) METHOD OF USING A MOTION SENSOR WITH A BICYCLE SPROCKET ASSEMBLY

(76) Inventor: Masahiko Fukuda, 33-2, Mukonosho 2-chome, Amagasaki-shi (JP)

(*) Notice: Subject to any disclaimer, the term of this patent is extended or adjusted under 35 U.S.C. 154(b) by 0 days.

(21) Appl. No.: 10/698,083

(22) Filed: Oct. 28, 2003

(65) Prior Publication Data
US 2004/0092347 A1 May 13, 2004

Related U.S. Application Data

(62) Division of application No. 09/216,088, filed on Dec. 18, 1998, now Pat. No. 6,676,549.

(51) Int. Cl.
F16H 7/22 (2006.01)
F16H 9/00 (2006.01)
F16H 59/00 (2006.01)

(52) U.S. Cl. .................... 474/102; 474/82; 474/80
(58) Field of Classification Search ........... 474/102, 474/70, 80–82, 50; 280/259–21, 206, 256, 280/220, 267; 324/173–174; 310/165, 181; 137/807; 251/129.61, 909, 827; 73/118.1, 73/514.39, 514.14
See application file for complete search history.

(56) References Cited

U.S. PATENT DOCUMENTS

| 3,505,595 A | 4/1970 | Favre |
| 3,535,950 A | 10/1970 | Shimano et al. |
| 3,898,563 A | 8/1975 | Erisman |
| 3,919,891 A | 11/1975 | Stuhlmuller et al. |
| 4,102,215 A | 7/1978 | Nagano et al. |
| 4,308,665 A | 1/1982 | Losch |
| 4,331,918 A | 5/1982 | Dunch |
| 4,430,800 A | 2/1984 | Shimano |
| 4,434,801 A | 3/1984 | Jiminez et al. |
| 4,490,127 A | 12/1984 | Matsumoto et al. |
| 4,541,500 A | 9/1985 | Gelhard |
| 4,636,769 A | 1/1987 | Tsuyama |
| 4,645,213 A | 2/1987 | Washimi et al. |
| 4,662,644 A | 5/1987 | Nelson |
| 4,889,521 A | 12/1989 | Nagano |
| 4,901,562 A | 2/1990 | Beakas et al. |
| 4,966,380 A | 10/1990 | Mercat |
| 5,002,296 A * | 3/1991 | Chiu .......................... 280/260 |
| 5,065,633 A | 11/1991 | Mercat |
| 5,205,794 A | 4/1993 | Browning |

(Continued)

FOREIGN PATENT DOCUMENTS

DE 3226357 A1 * 1/1984

(Continued)

Primary Examiner—Marcus Charles
(74) Attorney, Agent, or Firm—James A. Deland

(57) ABSTRACT

A sensor retainer for a bicycle sprocket assembly includes an annular member for mounting and rotating coaxially with the bicycle sprocket assembly and a sensor element fixed to the annular member. Alternatively, the sensor retainer may include a fixing member for mounting a derailleur or other transmission to a bicycle frame and a sensor element mounted to the fixing member.

16 Claims, 13 Drawing Sheets

U.S. PATENT DOCUMENTS

| | | |
|---|---|---|
| 5,213,548 A | 5/1993 | Colbert et al. |
| 5,223,760 A | 6/1993 | Peck et al. |
| 5,254,044 A | 10/1993 | Anderson |
| 5,336,995 A | 8/1994 | Caron |
| 5,426,997 A | 6/1995 | Brion |
| 5,470,277 A | 11/1995 | Romano |
| 5,480,356 A | 1/1996 | Campagnolo |
| 5,545,096 A | 8/1996 | Su |
| 5,560,266 A | 10/1996 | Shikimori et al. |
| 5,876,159 A | 3/1999 | Tseng et al. |
| 5,900,703 A | 5/1999 | Li |
| 6,045,472 A | 4/2000 | Sung et al. |
| 6,102,821 A | 8/2000 | Nakamura |
| 6,139,456 A | 10/2000 | Lii et al. |
| 6,158,470 A | 12/2000 | Ivers et al. |

FOREIGN PATENT DOCUMENTS

| | | |
|---|---|---|
| DE | 4340471 C1 | 2/1995 |
| EP | 773157 A2 | 5/1997 |
| FR | 2413731 | 7/1979 |
| GB | 2128337 A * | 4/1984 |
| JP | 57-93861 | 11/1980 |
| JP | 8-104282 A | 4/1996 |
| JP | 8-271358 A | 10/1996 |
| JP | 8-301175 A | 11/1996 |
| JP | 2000-185682 A | 7/2000 |
| JP | 2000-193540 A | 7/2000 |
| WO | WO 95/26900 A1 | 10/1995 |

* cited by examiner

US 7,004,862 B2

METHOD OF USING A MOTION SENSOR WITH A BICYCLE SPROCKET ASSEMBLY

CROSS REFERENCE TO RELATED APPLICATIONS

This application is a division of application Ser. No. 09/216,088, filed Dec. 18, 1998 now U.S. Pat. No. 6,676,549.

BACKGROUND OF THE INVENTION

The present invention is directed to electrical shift control devices for bicycle transmissions and, more particularly, to a motion sensor for use with a bicycle sprocket assembly.

Motion sensors are commonly used with bicycles to sense rotation of the wheel or pedal crank so that bicycle speed and cadence may be computed by a bicycle computer and displayed to the rider. Such information also may be used to control an automatic or semi-automatic bicycle transmission, wherein the bicycle speed or cadence may be used to determine when to change gear ratios. The typical motion sensor usually comprises a magnet attached to the wheel or crank arm and a magnetic sensor attached to the bicycle frame. When the magnet passes in close proximity to the magnetic sensor, the sensor provides a pulse to the bicycle computer. The speed or cadence then may be computed based on the elapsed time between successive pulses.

A disadvantage of traditional motion sensors is that they increase the number of parts at various locations on the bicycle, thus giving the bicycle a cluttered appearance. Furthermore, the appearance of a magnet rotating with the spokes can be disconcerting. Also, as the number of electronically controlled components increases, the amount of wiring needed to connect the various components together also increases. For example, if the bicycle uses an electronically controlled transmission, then wires must be routed for the wheel magnetic sensor, the crank magnetic sensor, the front transmission and the rear transmission. The aesthetic appearance of the bicycle is greatly diminished by such excessive wiring.

SUMMARY OF THE INVENTION

The present invention is directed to a motion sensor for use with a bicycle sprocket assembly wherein a magnet or first sensor element is mounted for rotation with the sprocket assembly. Another feature of the present invention is a magnetic sensor or second sensor element being mounted in close proximity to the bicycle transmission. Associating the first sensor element with the sprocket assembly eliminates the requirement of mounting the first sensor element on the spokes, and mounting the second sensor element in close proximity to the bicycle transmission allows the wiring for the second sensor element, if any, to be combined with any wiring or cables already routed to the transmission. The present invention thus combines various structures and functions in proximity to each other and results in a less cluttered appearance for the bicycle.

In one embodiment of the present invention, a sensor retainer for a bicycle sprocket assembly includes an annular member for mounting and rotating coaxially with the bicycle sprocket assembly and a sensor element fixed to the annular member. Alternatively, the sensor retainer may include a fixing member for mounting a derailleur or other transmission to a bicycle flame and a sensor element mounted to the fixing member.

In a more specific embodiment, a sensor assembly for a bicycle includes a plurality of sprockets mounted together for rotation around a common axis; a first sensor element coupled for rotation with the plurality of sprockets; and a second sensor element for attachment in close proximity to the plurality of sprockets so that the first sensor element rotates relative to the second sensor element. If desired, the first sensor element may include a signal generating element such as a magnet, and the second sensor element may include a signal receiving element such as a magnetic sensor. The second sensor element may include a first sensor unit for communicating with the first sensor element and a second sensor unit for communicating with the first sensor element, wherein the first sensor unit is offset from the second sensor unit in a circumferential direction. Such a structure allows the direction of rotation as well as the speed of rotation of the plurality of sprockets to be determined.

In another embodiment of the present invention, the plurality of sprockets may include a first sprocket and a second sprocket, wherein the first sprocket includes a shift facilitating structure for facilitating shifting of a chain from the second sprocket to the first sprocket. In this embodiment the first sensor element may be located at a specified rotational position relative to the shift facilitating structure so that the position of the shift facilitating structure may be determined; This feature has special usefulness when the sensor assembly is used in conjunction with an electronically controlled derailleur because then the derailleur may be commanded to shift the chain from the second sprocket to the first sprocket when the shift facilitating structure is in the optimum rotational position.

DETAILED DESCRIPTION OF THE EMBODIMENTS

Figure 1:
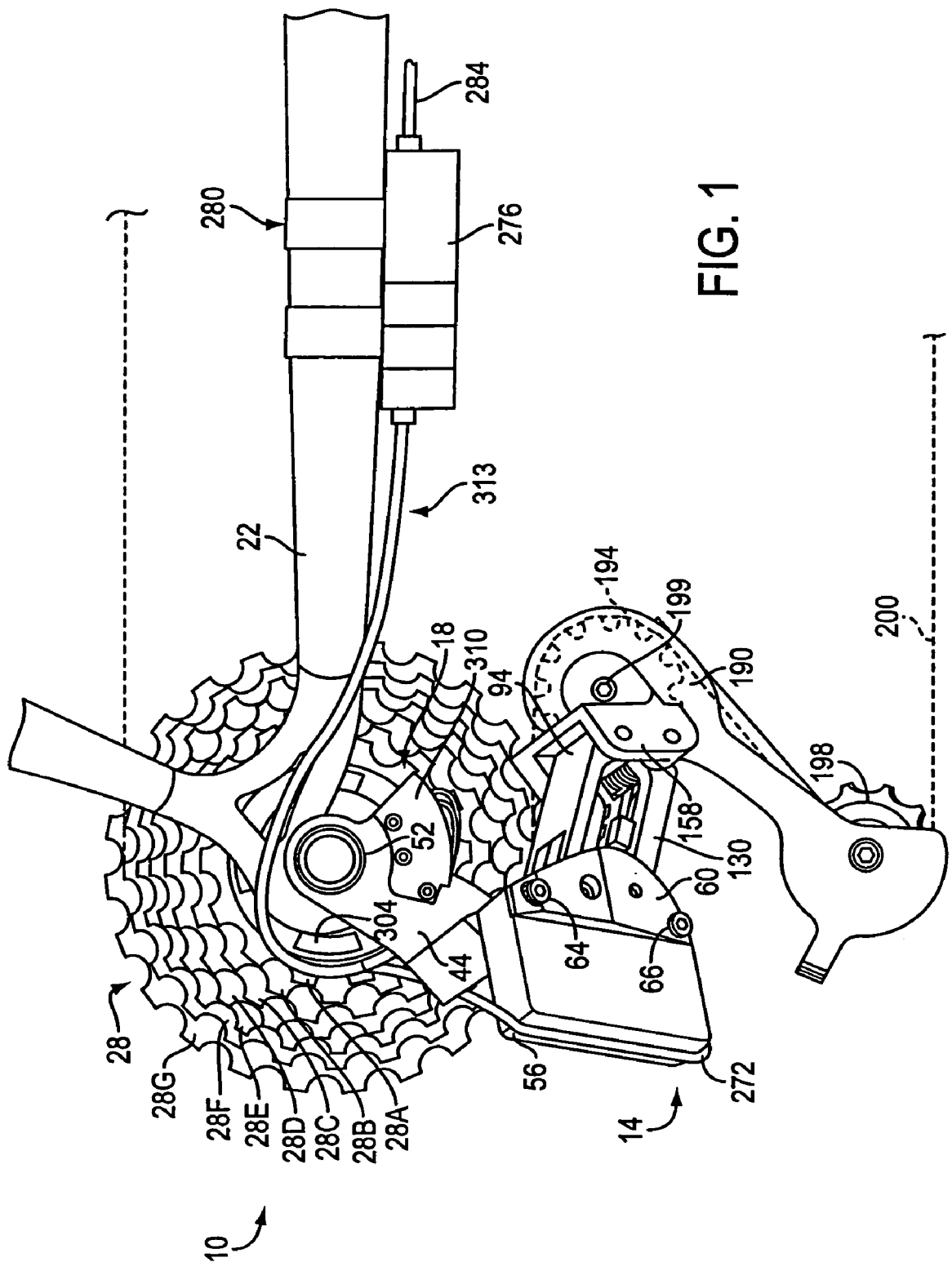
FIG. 1 is a side view of a rear portion of a bicycle that uses a particular embodiment of a bicycle transmission including a motor driven derailleur and motion sensor according to the present invention.
Figure 2:
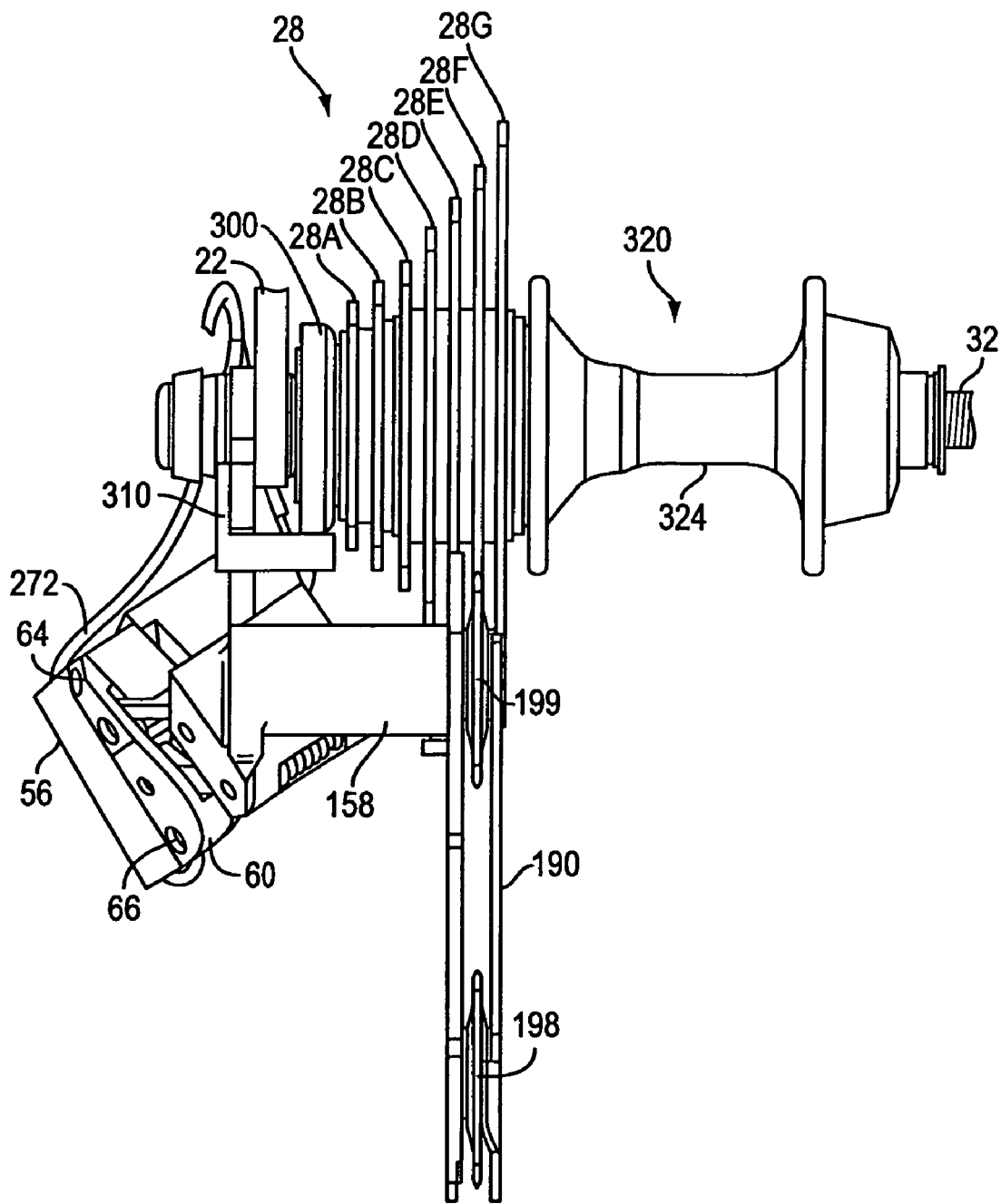
FIG. 2 is a front view the bicycle transmission shown in FIG. 1.
Figure 3:
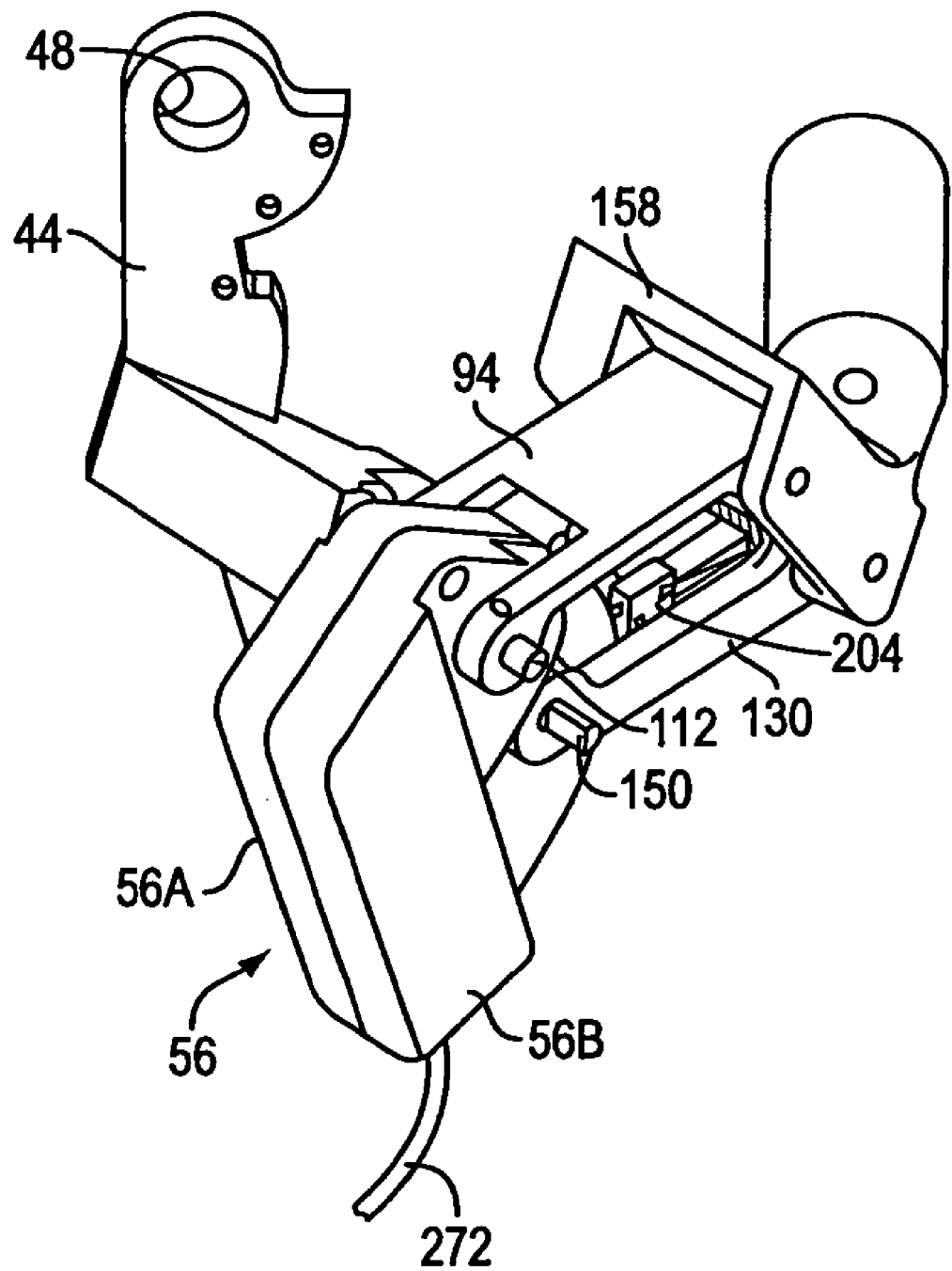
FIG. 3 is an oblique view of a portion of the motor driven derailleur shown in FIG. 1.

FIG. 1 is a side view of a rear portion of a bicycle that uses a particular embodiment of a bicycle transmission 10 according to the present invention including a motor driven derailleur 14 and a motion sensor 18 mounted to a bicycle frame 22. More specifically, a sprocket assembly 28 comprising plurality of sprockets 28(A–G) are coaxially and rotatably mounted around an axle 32 (FIG. 7) forming part of a freehub-style wheel hub 320. As shown in FIGS. 1–6, derailleur 14 includes a base member 44 with an axle opening 48 so that derailleur 14 may be mounted to frame 22 by passing axle 32 through axle opening 48 and screwing a nut 52 onto axle 32. A motor unit housing 56 and motor unit cover 60 are formed as part of the base member 44 by inserting screws 64 and 66 through respective openings 70 and 74 in motor unit cover 60, through respective openings 78 and 82 in motor unit housing 56, and into threaded openings 86 and 90 in base member 44.

Figure 4:
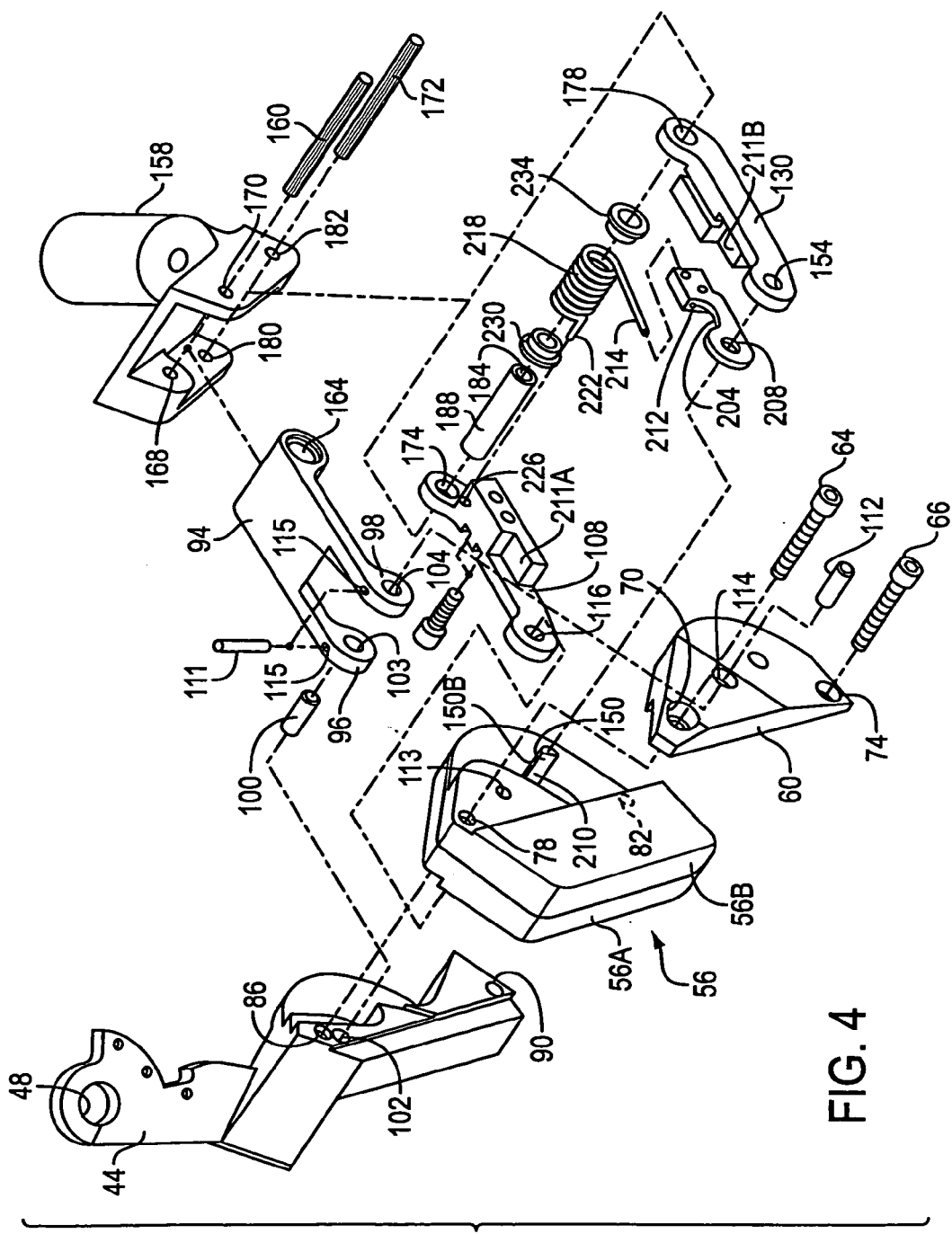
FIG. 4 is an exploded view of the portion of the motor driven derailleur shown in FIG. 3.

A link member 94 having prongs 96 and 98 is pivotably coupled to base member 44 and motor unit 56 by a pivot shaft 100 that extends through an opening 102 in base member and through an opening 103 in prong 96, and by a pivot shaft 112 that extends through an opening 113 in motor unit housing 56 and through an opening 104 in prong 98. Thus, prong 96 is disposed between base member 44 and motor unit housing 56, and prong 98 is disposed between motor unit housing 56 and motor unit cover 60. Fixing bolts 111 (only one is shown in FIG. 4) extend into openings 115 in prongs 96 and 98 to fix pivots shafts 100 and 112 in place. A link member 108 is pivotably coupled to motor unit housing 56 by a shaft section 150A (FIG. 6) of a pivot shaft 150 that passes through an opening 116 in link member 108, and a link member 130 is pivotably coupled to motor unit housing 56 by a shaft section 150B of pivot shaft 150 that passes through an opening 154 in link member 130. As discussed in more detail below, pivot shaft 150 also functions as an actuator shaft for moving the derailleur. The other end of link member 94 is pivotably connected to a movable member 158 by a pivot shaft 160 that extends through an opening 164 in link member 94 and through openings 168 and 170 in movable member 158. Similarly, the other ends of link members 108 and 130 are pivotably connected to movable member 158 by a pivot pin 172 that passes through an opening 174 in link member 108, through an opening 178 in link member 130, and through openings 180 and 182 in movable member 158. Pivot pin 172 also extends through an opening 184 in a spacer 188 disposed between link members 108 and 130. Thus, motor unit housing 56, link members 94, 108 and 130, and movable member 158 form a "four-bar" type linkage mechanism (wherein link members 108 and 130 function as one "bar") so that movable member 158 moves relative to base member 44 and motor unit housing 56. A chain guide 190 having a guide pulley 194 and a tension pulley 198 is pivotably mounted to movable member 158 through a-pivot shaft 199 in a known manner for switching a chain 200 among the plurality of sprockets 28(A–G).

An actuating member in the form of an actuating arm 204 is nonrotatably mounted to pivot shaft 150 by keying an opening 208 on one end of actuating arm 204 to a flat 210 on pivot shaft 150. The other end of actuating arm 204 normally rests on abutments 211A and 211B formed on link members 108 and 130, and it has an opening or groove 212 for receiving a first end 214 of a coil spring 218 that is coiled around spacer 188. A second end 222 of spring 218 is inserted into an opening 226 in link member 108. Bushings 230 and 234 are disposed between spring 218 and link members 108 and 130, respectively, for minimizing friction between spring 218 and link members 108 and 130.

Figure 5:
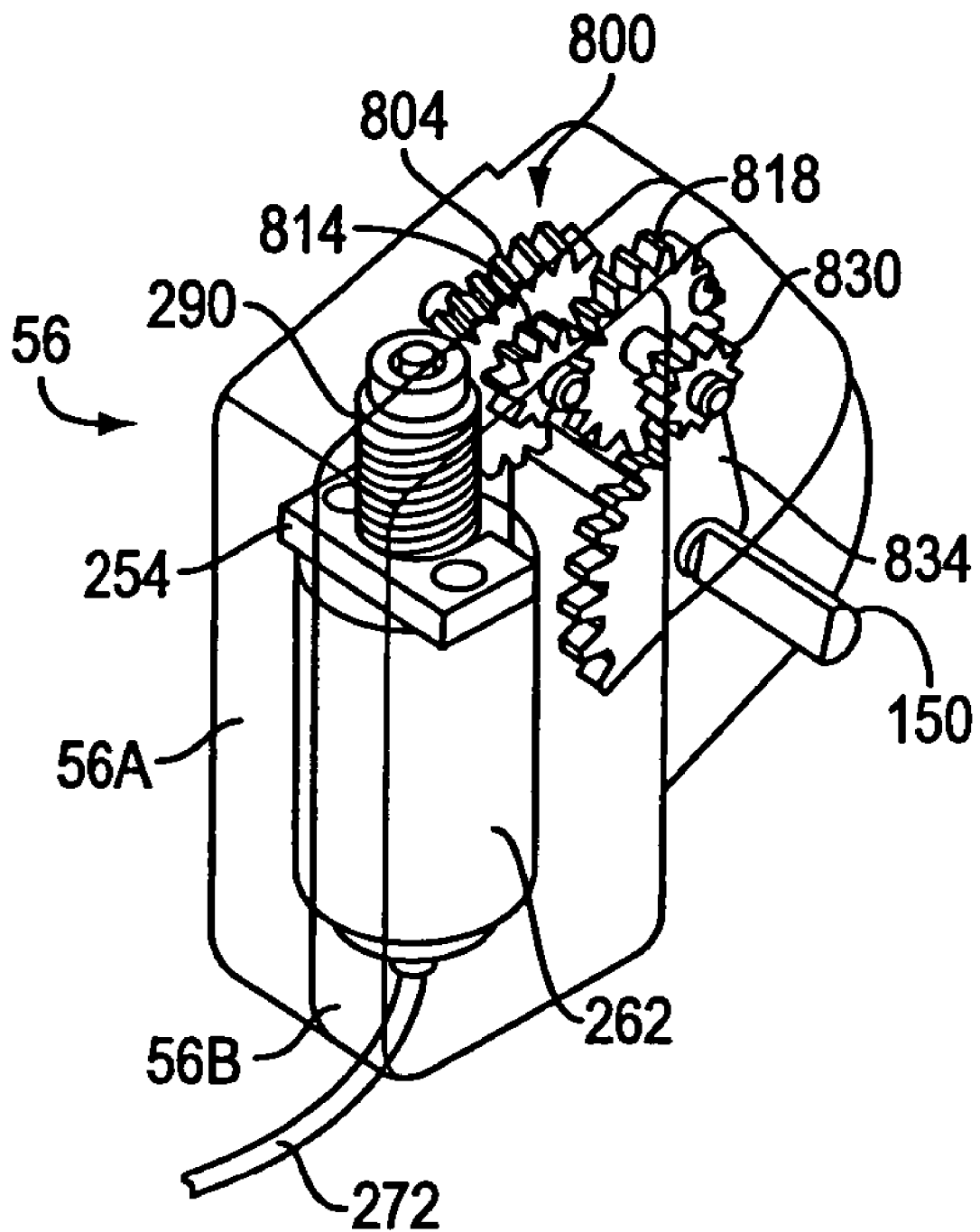
FIG. 5 is a view of the motor unit for the derailleur shown in FIG. 3 illustrating a particular embodiment of a gear reduction unit according to the present invention.
Figure 6:
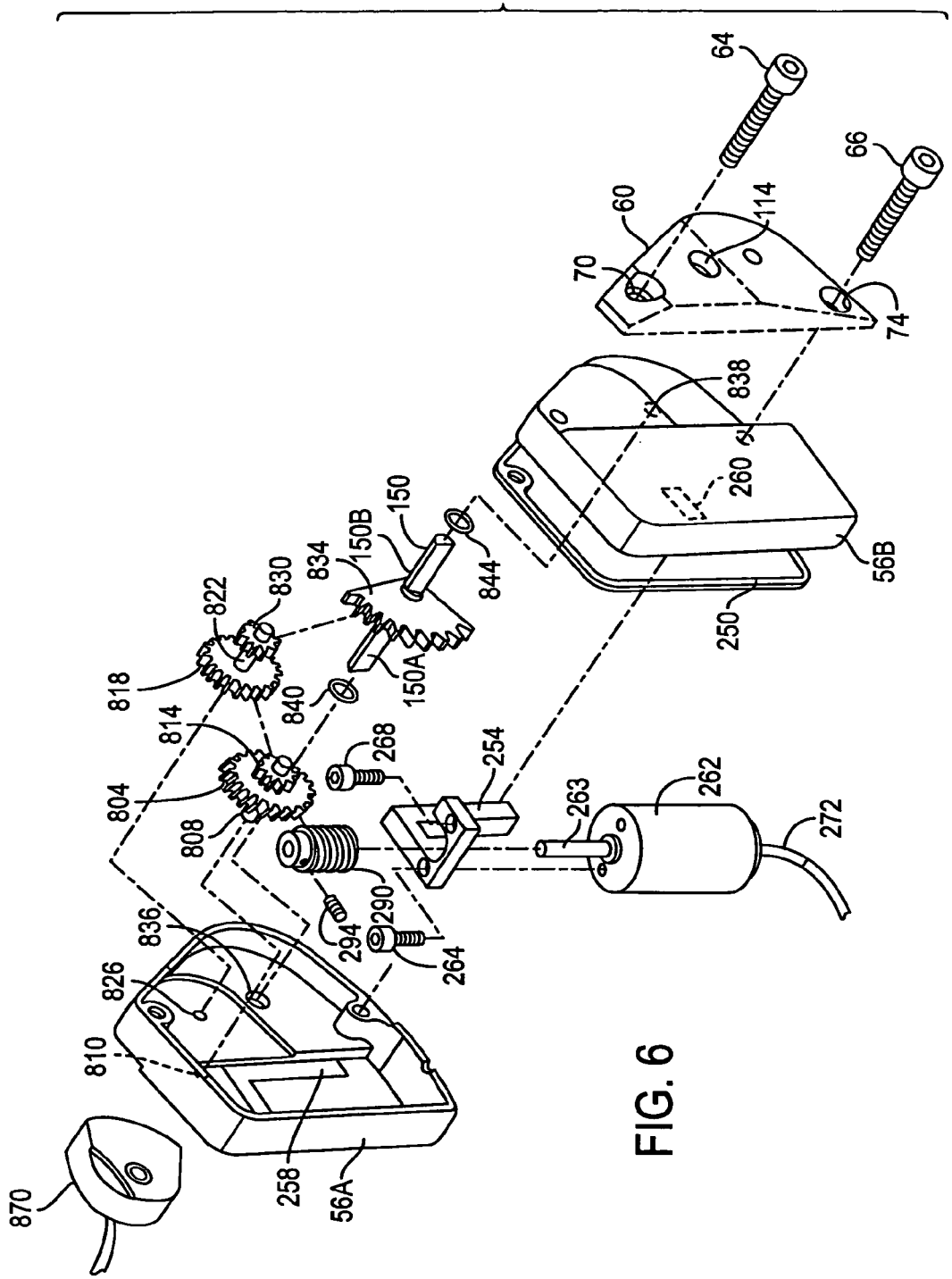
FIG. 6 is an exploded view of the motor unit shown in FIGS. 3–5.
Figure 7:
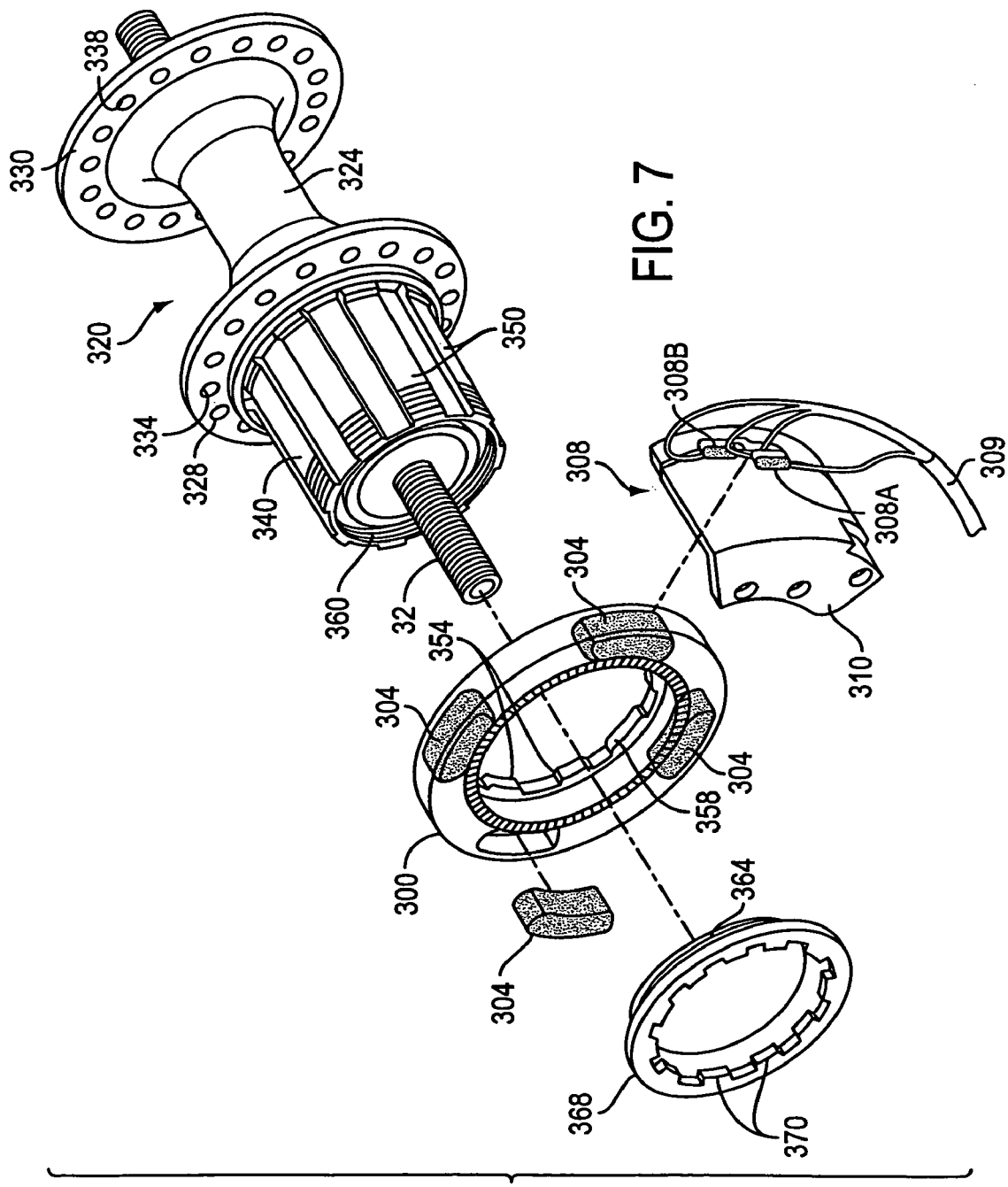
FIG. 7 is an exploded view of the motion sensor shown in FIG. 1 without the sprockets.
Figure 8:
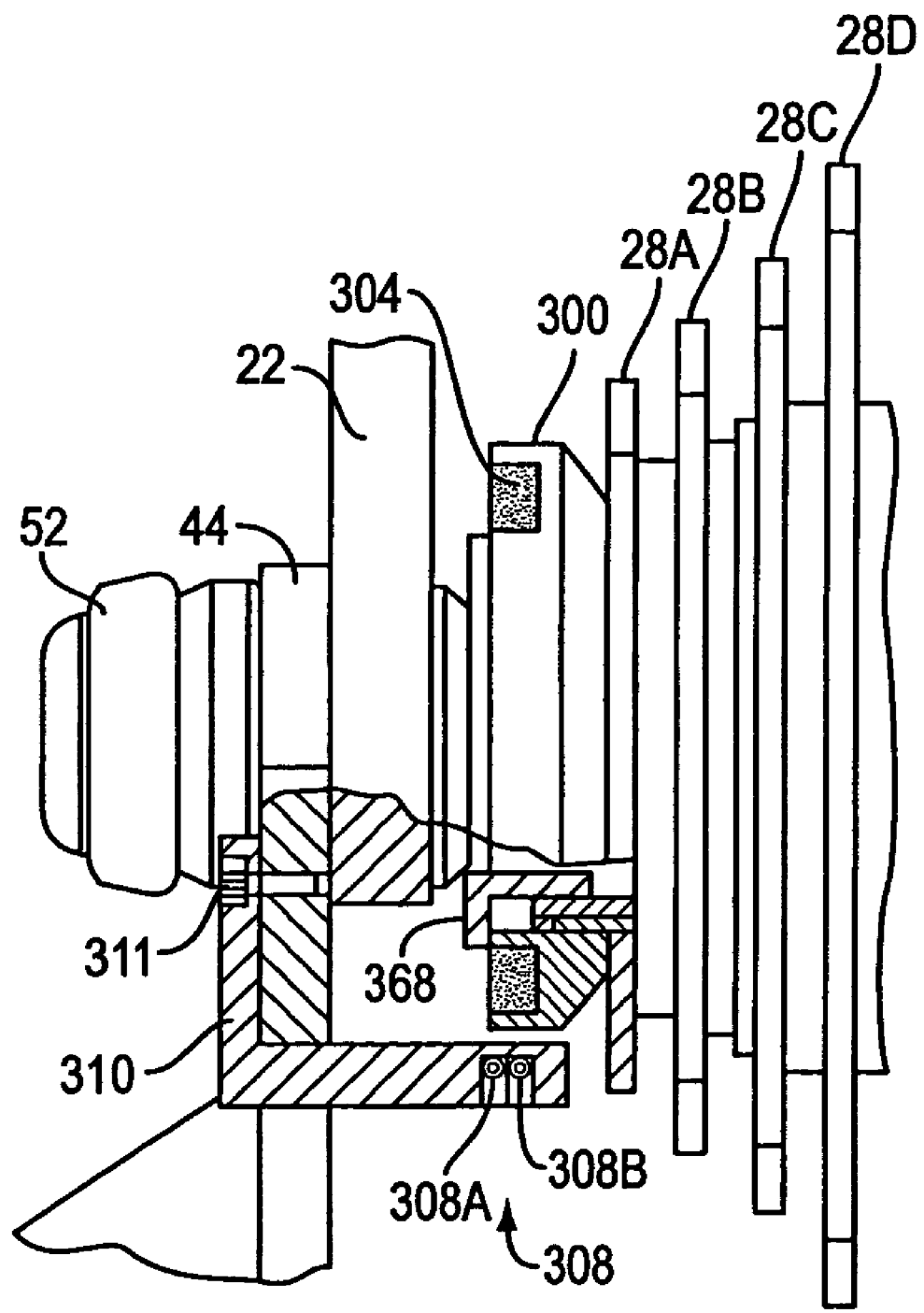
FIG. 8 is a partial cross-sectional view of the motion sensor shown in FIG. 1.

As shown in FIGS. 5 and 6, motor unit housing 56 includes a first housing section 56A, a second housing section 56B, and a gasket 250 between first housing section 56A and second housing section 56B. Disposed within motor unit housing 56 is a mounting bracket 254 that seats within a groove 258 formed in first housing section 56A and a groove 260 formed in second housing section 56B. A motor 262 having a drive shaft 263 is rigidly fixed to mounting bracket 254 by screws 264 and 268. Motor 262 is controlled by signals received over a communication bus 272 connected to an electronic control unit 276 (FIG. 1) which, in turn, is attached to frame 22 through a mounting bracket 280. Electronic control unit 276 further communicates with an electronic control center (not shown, but typically mounted on the bicycle handlebars) through a communication bus 284.

A worm gear 290 is fixed to motor drive shaft 263 by a set screw 294 for driving pivot shaft 150 through a gear reduction unit 800. Gear reduction unit 800 includes a larger diameter gear 804 that meshes with worm gear 290. Large diameter gear 804 is pivotably mounted to first housing section 56A through a pivot shaft 808 seated in a recess 810 formed in first housing section 56A. A smaller diameter gear 814 is nonrotatably fixed to larger diameter gear 814 and meshes with another larger diameter gear 818. Larger diameter gear 818 is pivotably mounted to first housing section 56A through a pivot shaft 822 that seats in a recess 826 formed in first housing section 56A. A smaller diameter gear 830 is nonrotatably fixed to pivot shaft 822 and meshes with a fan gear 834 that is nonrotatably fixed to pivot shaft 150. Pivot shaft 150 extends through an opening 836 in first housing section 56A and through an opening 838 in second housing section 56B. O-ring seals 840 and 844 are disposed around pivot shaft 150 on opposite sides of fan gear 834 for preventing contaminants from entering motor unit housing 56 through openings 836 and 838. A potentiometer 870 is fitted to shaft section 150A of pivot shaft 150 to determine the rotational position of pivot shaft 150 and hence of movable member 158.

In operation, motor 262 rotates pivot shaft 150 counterclockwise through gear reduction unit 800 to cause chain guide 190 to switch chain 200 from a larger diameter sprocket 28(A–G) to a smaller diameter sprocket 28(A–G), and motor 262 rotates pivot shaft 150 clockwise through gear reduction unit 800 to cause chain guide 190 to switch chain 200 from a smaller diameter sprocket 28(A–G) to a larger diameter sprocket 28(A–G). When motor 262 rotates pivot shaft 150 counterclockwise, actuating arm 204 rotates counterclockwise and pulls upwardly on first end 214 of spring 218. If there is no significant resistance to movement of movable member 158, then actuating arm 204 remains seated on abutments 211A and 211B, and the upward movement of actuating arm 108 causes spring 218 to lift up on spacer 188. This, in turn, causes movable member 158 to move toward a smaller sprocket 28(A–G) without causing the first end 214 of spring 218 to twist around spacer 188.

However, if a large resistance is applied to the movement of movable member 158, such as when the cyclist is not pedaling, then actuating arm 204 lifts up from abutments 211A and 211B while movable member 158 remains stationary, and the upward movement of actuating arm 204 causes first spring end 214 to twist around spacer 218, thus increasing the tension on coil spring 218. Coil spring 218 thus saves the energy for the shift operation until the source of resistance to movement of movable member 158 is removed, such as when the cyclist resumes pedaling. When this resistance is removed, movable member 158 moves toward a smaller diameter sprocket 28(A–G), and abutments 211A and 211B on link members 108 and 130 rise until they contact actuating arm 204.

It should be noted that coil spring 218 also functions as a shock absorber in the event the bicycle falls over and the derailleur strikes the ground. Thus, when movable member 158 is struck from the left in FIG. 2, the movable member tends to move downward. As understood from FIG. 4, this would cause abutments 211A and 211B to move downward away from actuating arm 204, thus absorbing the shock.

When motor 262 rotates pivot shaft 150 in the clockwise direction, actuating arm 204 presses against abutments 211A and 211B, thus causing movable member 158 to move toward a larger diameter sprocket 28(A–G).

Motion sensor 18 provides information about the rotational state of the plurality of sprockets 28(A–G). This information may be used to ascertain the speed of rotation of the plurality of sprockets 28(A–G) and/or the rotational position of the plurality of sprockets 28(A–G). This information may be used to determine if and when to activate motor 262 to shift the derailleur. For example, if the plurality of sprockets 28(A–G) are not rotating, thus creating significant resistance to movement of movable member 158, it may be desirable to delay the shift operation until the cyclist resumes pedaling. Also, if the plurality of sprockets 28(A–G) include shift facilitating structures (described below) at certain locations, then it may be desirable to activate motor 262 only when the shift facilitating structures are located in a desired position relative to the derailleur guide pulley 199.

As shown in FIGS. 1, 2, 7 and 8, motion sensor 18 includes a sensor retainer 300 for mounting coaxially with the sprocket assembly 28 so that the sensor retainer 300 rotates together with the sprocket assembly 28. A plurality of first sensor elements 304 in the form of signal generating elements such as magnets are embedded within or otherwise mounted circumferentially around sensor retainer 300 for rotation with sensor retainer 300. A second sensor element 308 is attached to base member 44 or otherwise mounted in close proximity to sensor retainer 300 so that sensor retainer 300 rotates relative to second sensor element 308. In this embodiment, second sensor element 308 includes a frame 310 attached to base member 44 through bolts 311 so that second sensor element 308 is disposed on rear derailleur 14, a first sensor unit 308A for communicating with the plurality of first sensor elements 304, and a second sensor unit 308B for communicating with the plurality of first sensor elements 304. Each sensor unit 308A and 308B comprises a signal receiving element such as a magnetic signal receiver, and first sensor unit 308A is offset from second sensor unit 308B in a circumferential direction. Thus, the direction of rotation of sprocket assembly 28 can be determined based on which sensor unit 308A or 308B first receives the magnetic signal from each first sensor element 304. The elapsed time between receipt of the signal by first sensor unit 308A and receipt of the signal by second sensor unit 308B for a given revolution of sprocket assembly 28 provides a second source of data for the rotational speed of sprocket assembly 28 in addition to the traditional use of the elapsed time between receipt of the magnetic signal for successive revolutions of sprocket assembly 28. The received signals are communicated to electronic control unit 276 over a communication bus 309 which structurally merges with communication bus 272 from motor 262 to form an integrated communication bus 313 (FIG. 1).

In this embodiment, sensor retainer 300 is adapted to be mounted on a freehub-style wheel hub 320. Wheel hub 320 includes a hub shell 324 and a pair of spoke flanges 328 and 330 with spoke holes 334 and 338, respectively, for receiving the wheel spokes (not shown) that mount the hub 320 to the wheel rim (not shown). A cylindrical sprocket mounting sleeve 340 is rotatably mounted around axle 32 through a one-way clutch mechanism (not shown) such that sprocket mounting sleeve 340 transmits rotational force from sprocket assembly 28 to hub shell 324 when sprocket assembly 28 rotates in one direction only. The structure and function of wheel hub 320 including sprocket mounting sleeve 340 and the one way clutch are well known, so a detailed description of these components shall be omitted.

A plurality of splines 350 are circumferentially formed on the outer peripheral surface of sprocket mounting sleeve 340 for mating with complementary splines 354 formed on the inner peripheral surface of sensor retainer 300. Similar splines (not shown) are formed on the inner peripheral surface of each of the plurality of sprockets 28(A–G). In this embodiment, a position locating spline 358 having a larger width than the other splines 354 is provided for engaging a similarly larger width position locating groove (not shown) on the sprocket mounting sleeve 340 so that sensor retainer 300 can be mounted on sprocket mounting sleeve 340 in only one rotational position. A similar position locating spline (not shown) is formed on the inner peripheral surface of each of the plurality of sprockets 28(A–G) for the same reason. Thus, not only will sensor retainer 300 and sprockets 28(A–G) be mounted on sprocket mounting sleeve 340 in only one rotational position, but the rotational position of sensor retainer 300 will be predetermined relative to sprocket assembly 28. This is very useful when the plurality of sprockets 28(A–G) have shift facilitating structures for facilitating the transfer of the chain from one sprocket to another as described more fully below.

The free end of sprocket mounting sleeve 340 includes a threaded inner peripheral surface 360 for engaging a threaded outer peripheral surface 364 of a lock ring 368. Screwing lock ring 368 onto sprocket mounting sleeve 340 thus nonrotatably fixes sprocket assembly 28 and sensor retainer 300 onto hub 320. Lock ring 368 also includes a plurality of splines 370 for engaging a tool (not shown) so that lock ring 368 may be installed or removed from sprocket mounting sleeve 340 as desired.

Figure 9:
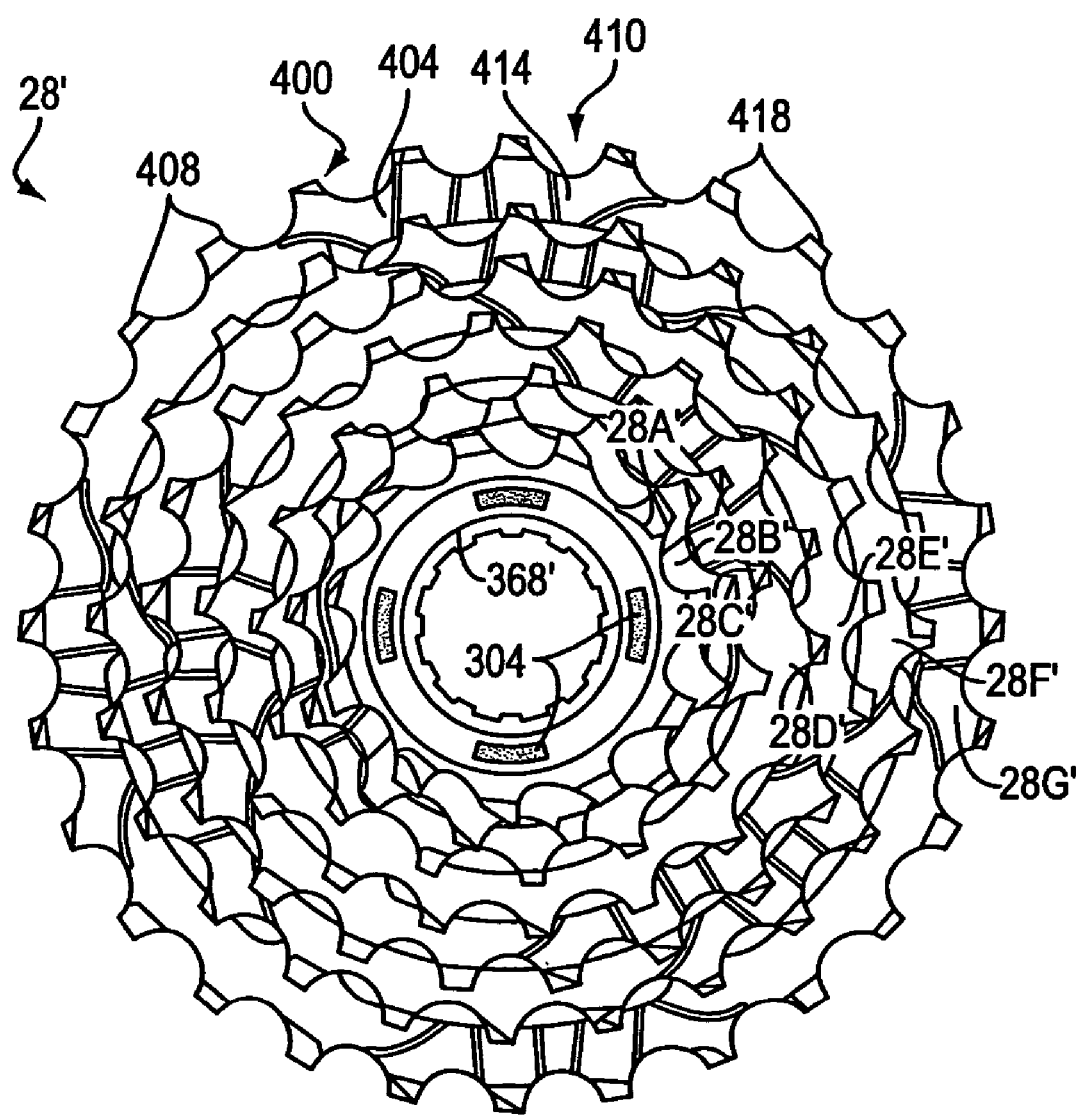
FIG. 9 is a side view of an alternative embodiment of a sprocket assembly with sensor elements fixed to a locking ring.

FIG. 9 is a side view of an alternative embodiment of a sprocket assembly 28' according to the present invention. In this embodiment, sensor retainer 300 is omitted. Instead, a lock ring 368' having the same general structure as lock ring 368 in FIG. 7 functions as the sensor retainer, wherein first sensor elements 304 are embedded within or otherwise mounted to lock ring 368'. Also, sprocket assembly 28' includes shift facilitating structures for facilitating of a chain from one sprocket to another. Using sprockets 28F' and 28G' as an example, sprocket 28G' includes a shift facilitating structure 400 in the form of a recess 404 disposed on the side of sprocket 28G' and one or more angled and/or beveled sprocket teeth 408 to facilitate transfer of the chain from sprocket 28F' to sprocket 28G'. Such structures are now well known and are described, for example, in U.S. Pat. No. 4,889,521, incorporated herein by reference. Sprocket 28G' also includes a shift facilitating structure 410 in the form of a recess 414 disposed on the side of sprocket 28G' and one or more angled and/or beveled sprocket teeth 418 to facilitate transfer of the chain from sprocket 28G' to sprocket 28F'. With such shift facilitating structures, it is desirable to activate the derailleur for shifting the chain when the guide wheel 199 is in close proximity to the shift facilitating structures. This information can be ascertained by using a motion sensor 18 according to the present invention.

Figure 10:
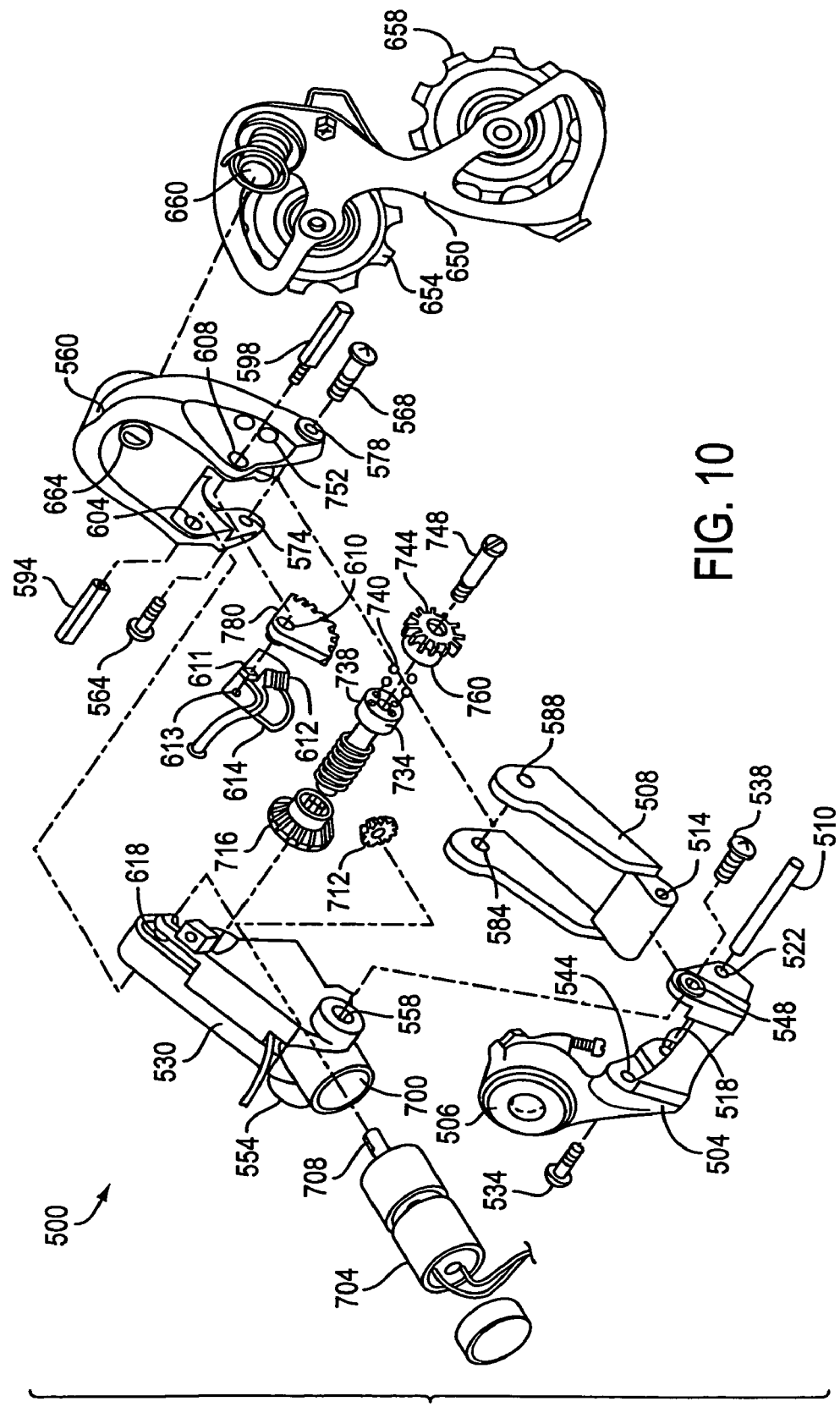
FIG. 10 is an exploded view of an alternative embodiment of a motor driven derailleur according to the present invention.

FIG. 10 is an exploded view of an alternative embodiment of a motor driven derailleur 500 according to the present invention. Whereas the motor driven derailleur shown in FIG. 1 had a motor integrally formed with the base member, in this embodiment the motor is integrally formed with one of the link members. More specifically, derailleur 500 includes a base member 504 with a mounting bolt 506 for mounting derailleur 500 to frame 22. A link member 508 is pivotably mounted to base member 504 by a pivot shaft 510 that passes through an opening 514 in link member 508 and through openings 518 and 522 in base member 504. A link member 530 is pivotably mounted to base member 504 by screws 534 and 538 that pass through respective openings 544 and 548 in base member 504 and into respective threaded openings 554 and 558 in link member 530. A movable member 560 is pivotably coupled to the other end of link member 508 by screws 564 and 568 that through respective openings 574 and 578 and into respective threaded openings 584 and 588 in link member 508. Movable member 560 also is pivotably coupled to the other end of link member 530 by a tubular nut 594 that passes through an opening 604 in movable member 560 and through an opening 618 in link member 530. A tubular screw 598 passes through an opening 608 in movable member 560, through an opening 610 in a fan gear 780, through an opening 611 in an electrical brush member 612, through an opening 613 in a resistance contact member 614, and threads into tubular nut 594. Movable member 560, tubular nut 594, tubular screw 598, fan gear 780 and electrical brush member 612 rotate together relative to link member 530, whereas resistance contact member 614 remains stationary. A chain guide 650 having a guide pulley 654 and a tension pulley 658 is pivotably mounted to movable member 560 in a conventional way by a threaded shaft 660 screwing into a threaded opening 664 in movable member 560.

Figure 11:
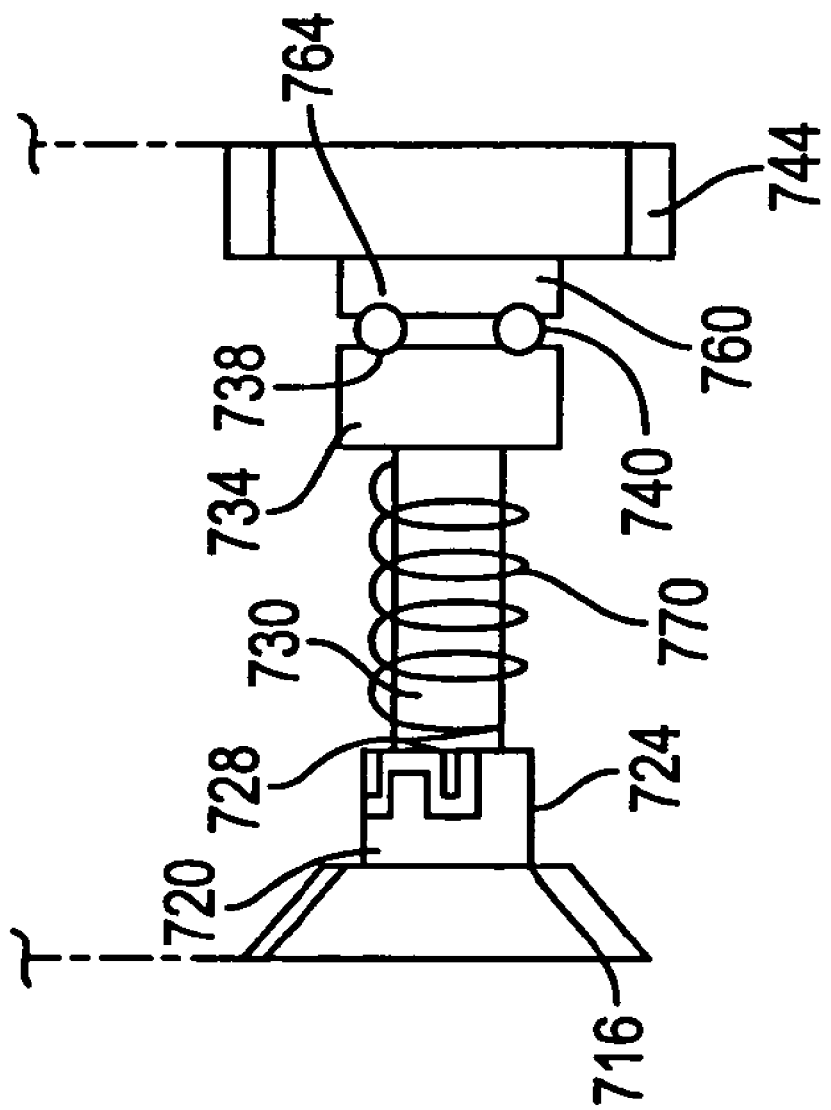
FIG. 11 is an assembled view of a clutch assembly used in the derailleur shown in FIG. 10.

In this embodiment, link member 530 includes a cylindrical bore 700 into which is fitted a motor 704 having a drive shaft 708. A drive gear 712 is nonrotatably mounted to drive shaft 708 for meshing with a bevel gear 716. As shown in FIG. 11, bevel gear 716 has a coupling shaft 720 with splines 724 that engage complementary splines 728 on one end of an intermediate shaft 730 such that intermediate shaft 730 cannot rotate relative to coupling shaft 720, but intermediate shaft 730 can move a certain distance axially relative to coupling shaft 720. The other end of intermediate shaft 730 is nonrotatably coupled to a first clutch disk 734 having a plurality of hemispherical recesses 738 formed on the side facing away from bevel gear 716. A plurality of balls 740 are fitted within hemispherical recesses 738. An intermediate gear 744 that meshes with fan gear 780 is pivotably coupled to movable member by a screw 748 that passes through an opening 752 in movable member 560 and into a threaded opening in intermediate gear 744. A second clutch disk 760 is nonrotatably mounted to intermediate gear 744, wherein second clutch disk 760 includes a plurality of hemispherical recesses for seating the plurality of balls 740.

Figure 12:
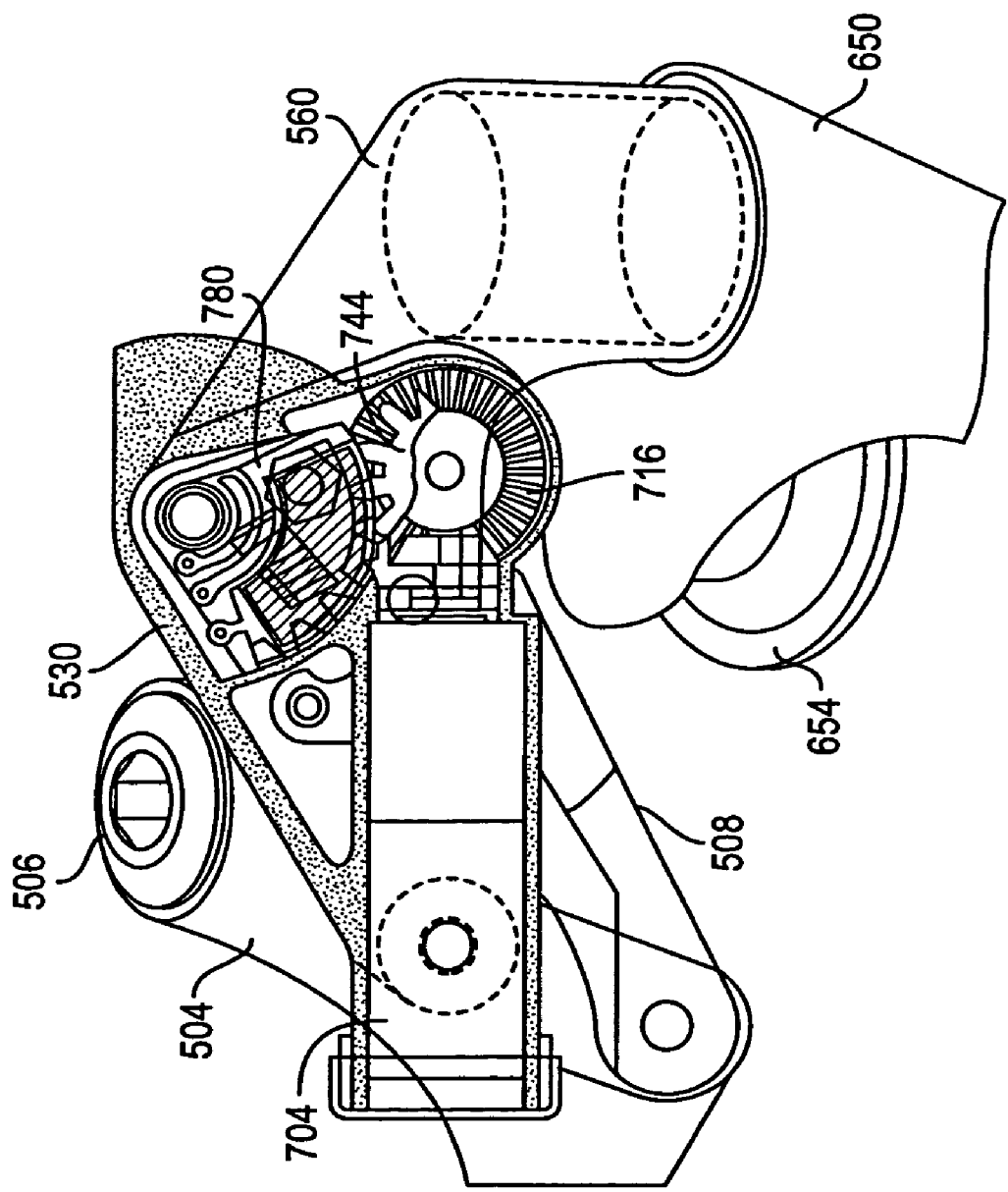
FIG. 12 is a partial cutaway view of the assembled motor driven derailleur shown in FIG. 10 in an initial position.
Figure 13:
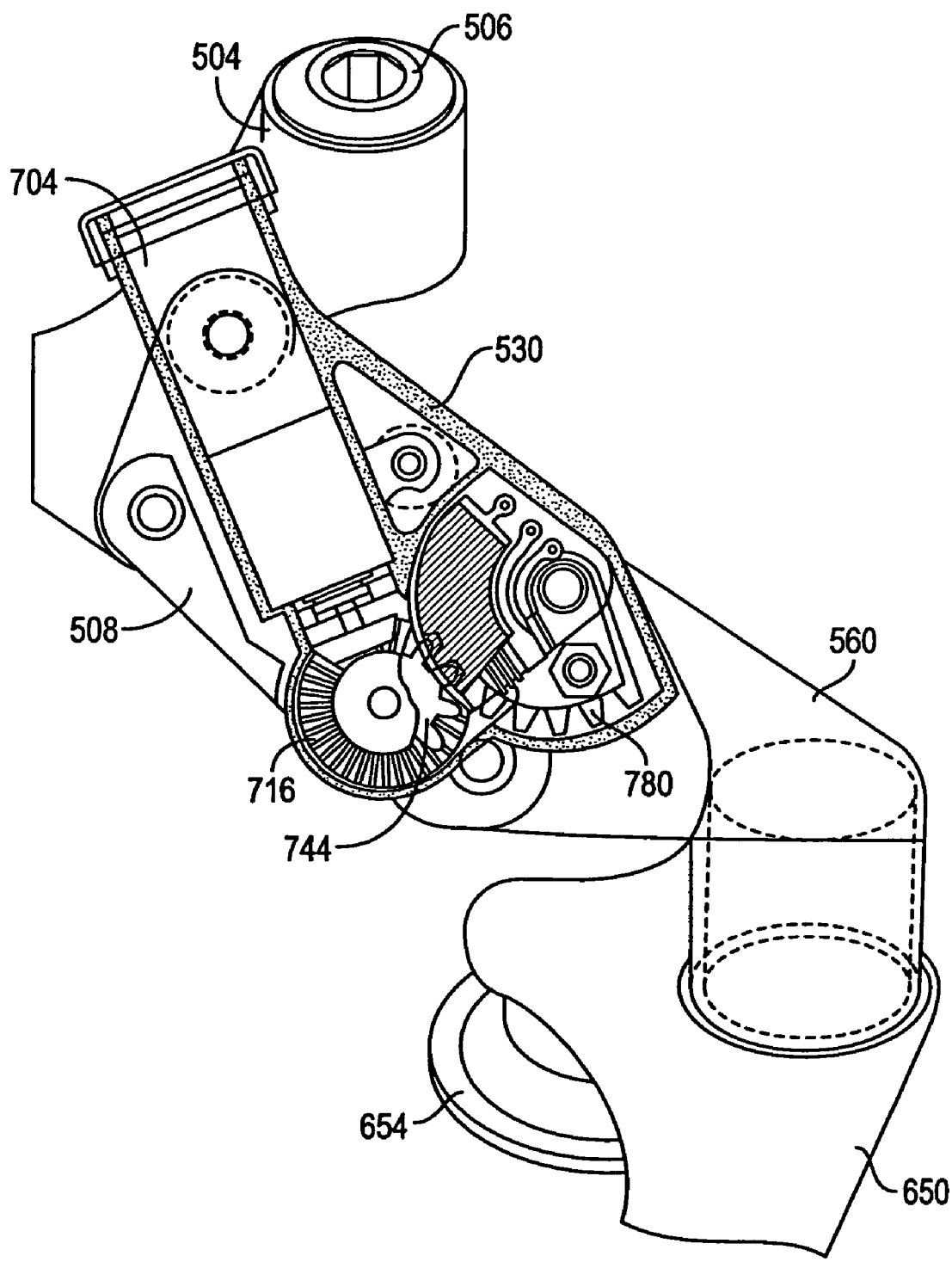
FIG. 13 is a partial cutaway view of the assembled motor driven derailleur shown in FIG. 10 in an extended position.

First clutch disk 734 is biased against second clutch disk 760 by a spring 770 such that balls 740 are seated in recesses 738 and 764 in a detenting relationship. Thus, bevel gear 716 and intermediate gear ordinarily rotate together as a unit unless substantial resistance is applied to intermediate gear 744. When substantial resistance is applied to intermediate gear 744, rotation of bevel gear 716 causes balls 740 to leave recesses 738 and/or 764, thus pushing intermediate shaft 730 to the left in FIG. 11 and allowing relative rotation between bevel gear 716 and intermediate gear 744. When the substantial resistance to intermediate gear 744 is removed, balls 740 re-engage recesses 738 and 764, and intermediate gear 744 continues integral rotation with bevel gear 716. Thus, rotation of drive shaft 708 causes fan gear 780 to move movable member 560 relative to link members 508 and 530 as shown in FIGS. 12 and 13. The position of movable member 560 relative to link members 508 and 530 may be ascertained by the cooperation of electrical brush member 612 and resistance contact member 614, which form a potentiometer.

While the above is a description of various embodiments of the present invention, further modifications may be employed without departing from the spirit and scope of the present invention. For example, the size, shape, location or orientation of the various components may be changed as desired. The functions of one element may be performed by two, and vice versa. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s).

Although sprocket retainer 300 was formed as an annular member, sprocket retainer could be any shape and need not be formed as a closed circle or polygon. The sensor elements 304 need not have a uniform circumferential spacing, and some applications may require only one sensor element 304. Sensor elements 308A and 308B may be disposed directly on base member 44. The chain shift facilitating structures 400 and 410 shown in FIG. 9 may be incorporated into the embodiment shown in FIG. 1, or they may be omitted. Thus, the scope of the invention should not be limited by the specific structures disclosed or the apparent initial focus on a particular structure or feature.

What is claimed is:

1. A method of operating an electronically controlled rear derailleur to switch a chain among a plurality of sprockets including a first sprocket and a second sprocket mounted together on a sprocket mounting sleeve that is rotatably supported relative to an axle so that the sprocket mounting sleeve and the plurality of sprockets together rotate relative to the axle around a common axis, wherein the method comprises the steps of:

rotating a first sensor element together with the sprocket mounting sleeve and the plurality of sprockets;

disposing a second sensor element on the bicycle so that the first sensor element rotates relative to the second sensor element;

wherein one of the first sensor element and the second sensor element comprises:

a first sensor unit for communicating with one of the first sensor element and the second sensor element; and a second sensor unit for communicating with one of the first sensor element and the second sensor element;

wherein the first sensor unit is offset from the second sensor unit in a circumferential direction;

receiving a first signal when one of the first sensor element and the second sensor element operatively passes by the first sensor unit as the plurality of sprockets rotate relative to the second sensor element;

receiving a second signal when one of the first sensor element and the second sensor element operatively passes by the second sensor unit as the plurality of sprockets rotate relative to the second sensor element;

determining a direction of rotation of the plurality of sprockets based on receipt of at least one of the first signal and the second signal; and commanding the derailleur to shift the chain between the first sprocket and the second sprocket in response to receipt of at least one of the first signal and the second signal.

2. The method according to claim 1 wherein the first sensor element comprises a signal generating element, wherein the first sensor unit comprises a first signal receiving element, and wherein the second sensor unit comprises a second signal receiving element.

3. The method according to claim 2 wherein the signal generating element comprises a magnet.

4. The method according to claim 1 wherein the second sensor element comprises the first sensor unit and the second sensor unit.

5. The method according to claim 4 wherein the step of disposing the second sensor element on the bicycle comprises the step of disposing the second sensor element on the rear derailleur so that the second sensor element is fixed relative to a frame of the bicycle when the first signal and the second signal are received.

6. The method according to claim 1 wherein the determining step comprises the step of determining a direction of rotation of the plurality of sprockets based on which one of the first signal and the second signal is received first.

7. A method of operating an electronically controlled rear derailleur to switch a chain among a plurality of sprockets including a first sprocket and a second sprocket mounted together on a sprocket mounting sleeve that is rotatably supported relative to an axle so that the sprocket mounting sleeve and the plurality of sprockets together rotate relative to the axle around a common axis, wherein the method comprises the steps of:

rotating a first sensor element together with the sprocket mounting sleeve and the plurality of sprockets;

disposing a second sensor element on the bicycle so that the first sensor element rotates relative to the second sensor element;

wherein one of the first sensor element and the second sensor element comprises:
a first sensor unit for communicating with the other one of the first sensor element and the second sensor element; and
a second sensor unit for communicating with the other one of the first sensor element and the second sensor element;
wherein the first sensor unit is offset from the second sensor unit in a circumferential direction;

receiving a first signal when one of the first sensor element and the second sensor element operatively passes by the first sensor unit as the plurality of sprockets rotate relative to the second sensor element;

receiving a second signal when the other one of the first sensor element and the second sensor element operatively passes by the second sensor unit as the plurality of sprockets rotate relative to the second sensor element;

determining a speed of rotation of the plurality of sprockets based on receipt of at least one of the first signal and the second signal; and, commanding the derailleur to shift the chain between the first sprocket and the second sprocket in response to receipt of at least one of the first signal and the second signal.

8. The method according to claim 7 wherein the first sensor element comprises a signal generating element, wherein the first sensor unit comprises a first signal receiving element, and wherein the second sensor unit comprises a second signal receiving element.

9. The method according to claim 8 wherein the signal generating element comprises a magnet.

10. The method according to claim 7 wherein the second sensor element comprises the first sensor unit and the second sensor unit.

11. The method according to claim 10 wherein the step of disposing the second sensor element on the bicycle comprises the step of disposing the second sensor element on the rear derailleur so that the second sensor element is fixed relative to a frame of the bicycle when the first signal and the second signal are received.

12. The method according to claim 7 wherein the determining step comprises the step of determining a speed of rotation of the plurality of sprockets based on an elapsed time between receiving the first signal and receiving the second signal.

13. A method of operating an electronically controlled derailleur to switch a chain among a plurality of sprockets including a first sprocket and a second sprocket mounted together on a sprocket mounting sleeve that is rotatably supported relative to an axle so that the sprocket mounting sleeve and the plurality of sprockets together rotate relative to the axle around a common axis, wherein the method comprises the steps of:

rotating a first sensor element together with the sprocket mounting sleeve and the plurality of sprockets;

disposing a second sensor element on the bicycle so that the first sensor element rotates relative to the second sensor element;

wherein one of the first sensor element and the second sensor element comprises:
a first sensor unit for communicating with the other one of the first sensor element and the second sensor element; and
a second sensor unit for communicating with the other one of the first sensor element and the second sensor element;
wherein the first sensor unit is offset from the second sensor unit in a circumferential direction;

receiving a first signal when one of the first sensor element and the second sensor element operatively passes by the first sensor unit as the plurality of sprockets rotate relative to the second sensor element;

receiving a second signal when the other one of the first sensor element and the second sensor element operatively passes by the second sensor unit as the plurality of sprockets rotate relative to the second sensor element;

determining a direction of rotation of the plurality of sprockets based on receipt of at least one of the first signal and the second signal; and commanding the derailleur to shift the chain between the first sprocket and the second sprocket in response to receipt of at least one of the first signal and the second signal so that the derailleur begins moving to shift the chain when the plurality of sprockets are located at a predetermined rotational position relative to the derailleur.

14. A method of operating an electronically controlled derailleur to switch a chain among a plurality of sprockets including a first sprocket and a second sprocket mounted together on a sprocket mounting sleeve that is rotatably supported relative to an axle so that the sprocket mounting sleeve and the plurality of sprockets together rotate relative to the axle around a common axis, wherein the method comprises the steps of:

rotating a first sensor element together with the sprocket mounting sleeve and the plurality of sprockets;
   disposing a second sensor element on the bicycle so that the first sensor element rotates relative to the second sensor element;
   wherein one of the first sensor element and the second sensor element comprises:
      a first sensor unit for communicating with one of the first sensor element and the second sensor element; and
      a second sensor unit for communicating with the other one of the first sensor element and the second sensor element;
      wherein the first sensor unit is offset from the second sensor unit in a circumferential direction;
   receiving a first signal when one of the first sensor element and the second sensor element operatively passes by the first sensor unit as the plurality of sprockets rotate relative to the second sensor element;
   receiving a second signal when the other one of the first sensor element and the second sensor element operatively passes by the second sensor unit as the plurality of sprockets rotate relative to the second sensor element;
   determining a speed of rotation of the plurality of sprockets based on receipt of at least one of the first signal and the second signal; and
   commanding the derailleur to shift the chain between the first sprocket and the second sprocket in response to receipt of at least one of the first signal and the second signal so that the derailleur begins moving to shift the chain when the plurality of sprockets are located at a predetermined rotational position relative to the derailleur.

15. A method of detecting a direction of rotation of a plurality of rear sprockets mounted together on a sprocket mounting sleeve that is rotatably supported relative to an axle of a bicycle so that the sprocket mounting sleeve and the plurality of sprockets together rotate relative to the axle around a common axis, wherein a rear derailleur switches a chain among the plurality of sprockets, and wherein the method comprises the steps of:

rotating a first sensor element together with the sprocket mounting sleeve and the plurality of sprockets;
   disposing a second sensor element on the bicycle so that the first sensor element rotates relative to the second sensor element;
   wherein one of the first sensor element and the second sensor element comprises:
      a first sensor unit for communicating with one of the first sensor element and the second sensor element; and
      a second sensor unit for communicating with the other one of the first sensor element and the second sensor element;
      wherein the first sensor unit is offset from the second sensor unit in a circumferential direction;
   receiving a first signal when one of the first sensor element and the second sensor element operatively passes by the first sensor unit as the plurality of sprockets rotate relative to the second sensor element;
   receiving a second signal when the other one of the first sensor element and the second sensor element operatively passes by the second sensor unit as the plurality of sprockets rotate relative to the second sensor element;
   determining a direction of rotation of the plurality of sprockets based on receipt of at least one of the first signal and the second signal; and
   wherein the step of disposing the second sensor element on the bicycle comprises the step of disposing the second sensor element on the rear derailleur so that the second sensor element is fixed relative to a frame of the bicycle when the first signal and the second signal are received.

16. A method of detecting a speed of rotation of a plurality of rear sprockets mounted together on a sprocket mounting sleeve that is rotatably supported relative to an axle of a bicycle so that the sprocket mounting sleeve and the plurality of sprockets together rotate relative to the axle around a common axis, wherein a rear derailleur switches a chain among the plurality of sprockets, and wherein the method comprises the steps of:

rotating a first sensor element together with the sprocket mounting sleeve and the plurality of sprockets;
   disposing a second sensor element on the bicycle so that the first sensor element rotates relative to the second sensor element;
   wherein one of the first sensor element and the second sensor element comprises:
      a first sensor unit for communicating with one of the first sensor element and the second sensor element; and
      a second sensor unit for communicating with the other one of the first sensor element and the second sensor element;
      wherein the first sensor unit is offset from the second sensor unit in a circumferential direction;
   receiving a first signal when one of the first sensor element and the second sensor element operatively passes by the first sensor unit as the plurality of sprockets rotate relative to the second sensor element;
   receiving a second signal when the other one of the first sensor element and the second sensor element operatively passes by the second sensor unit as the plurality of sprockets rotate relative to the second sensor element;
   determining a speed of rotation of the plurality of sprockets based on receipt of at least one o the first signal and the second signal; and
   wherein the step of disposing the second sensor element on the bicycle comprises the step of disposing the second sensor element on the rear derailleur so that the second sensor element is fixed relative to a frame of the bicycle when the first signal and the second signal are received.

* * * * *